United States Patent
Zendejas Hernández (10) Patent No.: US 12,527,757 B2
(45) Date of Patent: Jan. 20, 2026

(54) NANOEMULSION OF 18BETA-GLYCYRRHETINIC ACID

(71) Applicant: ATSO CORPORATE AFFAIRS, S.A. DE C.V., Mexico City (MX)

(72) Inventor: Ulises Zendejas Hernández, Mexico City (MX)

(73) Assignee: PROYECTOS ATSO S.A.P.I. DE C.V., Mexico City (MX)

( * ) Notice: Subject to any disclaimer, the term of this patent is extended or adjusted under 35 U.S.C. 154(b) by 803 days.

(21) Appl. No.: 17/633,823

(22) PCT Filed: Aug. 7, 2020

(86) PCT No.: PCT/MX2020/050025
§ 371 (c)(1),
(2) Date: Feb. 8, 2022

(87) PCT Pub. No.: WO2021/025550
PCT Pub. Date: Feb. 11, 2021

(65) Prior Publication Data
US 2022/0296544 A1    Sep. 22, 2022

(30) Foreign Application Priority Data

Aug. 8, 2019    (MX) .......................... A/2019/009482

(51) Int. Cl.
| A61K 31/19 | (2006.01) |
| A61K 9/06 | (2006.01) |
| A61K 9/107 | (2006.01) |
| A61K 47/10 | (2017.01) |
| A61K 47/44 | (2017.01) |
| A61P 35/00 | (2006.01) |

(52) U.S. Cl.
CPC .............. *A61K 31/19* (2013.01); *A61K 9/06* (2013.01); *A61K 9/1075* (2013.01); *A61K 47/10* (2013.01); *A61K 47/44* (2013.01); *A61P 35/00* (2018.01)

(58) Field of Classification Search
CPC ........ A61K 31/19; A61K 9/06; A61K 9/1075; A61K 47/10; A61K 47/44; A61P 35/00
See application file for complete search history.

(56) References Cited

FOREIGN PATENT DOCUMENTS

| CN | 105342987 A | * | 2/2016 | ............. A61K 31/14 |
| CN | 108785122 A | * | 11/2018 | ............. A61K 8/347 |
| MX | 2011002098 A | | 8/2012 | |
| RU | 2493852 C1 | | 9/2013 | |
| WO | 2019039931 A1 | | 2/2019 | |

OTHER PUBLICATIONS

Puglia, Carmelo, Luisa Rizza, Markus Drechsler, and Francesco Bonina. "Nanoemulsions as vehicles for topical administration of glycyrrhetic acid: characterization and in vitro and in vivo evaluation." Drug Delivery 17, No. 3 (2010): 123-129 (Year: 2010).*
CN105342987A, Machine Translation (Year: 2016).*
CN108785122A, English Machine Translation (Year: 2018).*
National Center for Biotechnology Information (National Center for Biotechnology Information. PubChem Compound Summary for CID 44435791, 18 beta-Glycyrrhetinic acid. https://pubchem.ncbi.nlm.nih.gov/compound/44435791. Accessed Mar. 8, 2025 (Year: 2025).*
Martin, A.E. and Murphy, F.H. (2000). Glycols, Propylene Glycols. In Kirk-Othmer Encyclopedia of Chemical Technology, (Ed.). ( Year: 2000).*
First Mexican Office Action issued in connection with the corresponding Mexican Patent Application No. MX/a/2019/009482 on Mar. 3, 2022.
Second Mexican Office Action issued in connection with the corresponding Mexican Patent Application No. MX/a/2019/009482 on May 20, 2022.
Third Mexican Office Action issued in connection with the corresponding Mexican Patent Application No. MX/a/2019/009482 on Nov. 25, 2022.
Notice of Allowance issued in connection with the corresponding Mexican Patent Application No. MX/a/2019/009482 on Mar. 21, 2023.
Expert Response issued in connection with the Chilean Patent Application No. 202200304 on Oct. 12, 2023.
European Search Report issued in connection with the corresponding European Patent Application No. 20 849 613.3 on May 27, 2022.
Invitation Pursuant to Rule 137(4) EPC and Article 94(3) EPC issued in connection with European Patent Application No. 20 849 613.3 on Jul. 8, 2024.
Expert Report issued in connection with the Chilean Patent Application No. 202200304 on Jul. 7, 2023.
International Search Report issued in connection with the corresponding International Application No. PCT/MX2020/050025 on Nov. 27, 2020.

(Continued)

*Primary Examiner* — James H Alstrum-Acevedo
*Assistant Examiner* — Carolyn L. Ladd
(74) *Attorney, Agent, or Firm* — The H.T. Than Law Group (57) ABSTRACT

The invention refers to pharmaceutical forms that potentiate the bioavailability of 18β-GA, having a high permeation on the application area mainly due to the effect of their small particle size, high concentration of the active ingredient, excipient composition, micelles with specific structural composition and polarity. The present pharmaceutical forms exhibit specific values for particle size, permeability, diffusion coefficient, and polydispersity helping to provide its technical advantages. Therapeutic uses of the pharmaceutical forms are also described, which include those therapeutic uses for which 18β-glycyrrhetinic acid is known to have an effect, such as anti-inflammatory, antiviral, antibacterial activity, hepatoprotective, used against skin diseases and anticarcinogenic. Mainly gelled solutions, emulsions and nanoemulsions, are intended for application in the vaginal and cervical area, for the treatment of diseases related to the human papillomavirus, such as infections, lesions, and cervical cancer.

21 Claims, 8 Drawing Sheets

(56) References Cited

OTHER PUBLICATIONS

Puglia C. et al. Nanoemulsions as vehicles for topical administration of glycyrrhetic acid: Characterization and in vitro and in vivo evaluation. Drug Delivery, Aug. 2, 2010, vol. 17, No. 3, pp. 123-129.
Machine translation of WO 2019039931 to Atso Corp Affairs S.A. DE C.V.
Machine translation of abstract of MX 2011002098 A to Desarrollos VPH SA DE CV.
Mishra M. et al. Improved skin penetration of hydrophobic Glycyrrhetinic Acid SmartCrystal(r) compared to its water soluble salt. Drug Delivery Letters, 2017, vol. 7, No. 3, pp. 211-218.
Machine translation of RU 2493852 to Klopotenko L L.
Zhuang H.M. et al. 18alpha-Glycyrrhetinic acid inhibits the viability of HR5-CL11 cervical carcinoma cells through induction of apoptosis and DNA damage. Bangladesh J. Pharmacol, Aug. 26, 2016, vol. 11, pp. 750-755.

\* cited by examiner

NANOEMULSION OF 18BETA-GLYCYRRHETINIC ACID

FIELD OF THE INVENTION

The present invention relates to formulations and pharmaceutical forms derived from a nanoemulsion containing 18β-glycyrrhetinic acid as a drug. Specifically, the invention provides a pharmaceutical formulation of a gelled nanoemulsion, with a concentration of glycyrrhetinic acid comprising from 0.001% to 30% w/w (percentage by weight). The different formulations are designed for the treatment of the different conditions on which the drug is known to have a therapeutic effect.

The therapeutic effects associated with the drug, and therefore with the formulations include anti-inflammatory, antiviral, antibacterial, hepatoprotective, skin diseases and anticancer activity.

The present formulations are preferably designed for the treatment of the following conditions derived from viral infections, preferably human papillomavirus (HPV). HPV conditions include HPV viral infection, koilocytes, papilloma, cervical intraepithelial lesions in their different stages, carcinomas of the genitourinary tract, perianal and rectum.

BACKGROUND OF THE INVENTION

Human papillomaviruses (HPV) are relatively small, non-enveloped DNA viruses, of approximately 52-55 nm in diameter, which are associated with benign and malignant epithelial lesions, including >95% of cervical cancers and ~20% of head and neck cancers. There are more than 200 HPV genotypes that infect and replicate in the cutaneous or mucosal epithelium, inducing benign lesions, including warts that are self-limiting and typically return over time.

The HPV replication cycle and its production of virions are closely related to the differentiation of epithelial cells. HPVs initially infect poorly differentiated, proliferative cells and those of the stratified epithelium. Initially the viral genome takes up residence as a nuclear plasmid with a low copy number, a subset of viral genes (the early genes) are expressed at low levels and no virions are generated. However, the viral life cycle is initiated when the basal cells are infected and divided and the daughter cells migrate to the suprabasal compartment to complete differentiation.

Currently, there are physical and chemical treatments for the control of HPV infections that produce precancerous lesions and intraepithelial neoplasia. On the side of physical methods that use techniques aimed at eliminating the area of infection, with methods such as cryotherapy, electrocautery, cone with electrosurgery, diathermic loop, cone with $CO_2$ laser, $CO_2$ laser photovaporization and cervical cone with scalpel. As for chemical treatments, drugs such as trichloroacetic acid, podophyllin, podophyllotoxin, 5-fluoruracil (5-FU) and imiquimod have been used, which have been drugs proving to be effective and safe, but only in the initial treatment of anogenital warts. These treatment options have limited impact on cure rates and long-term survival.

Glycyrrhizic acid (GA) is a drug that has been used in some formulations for the treatment of HPV infections. It is extracted from the roots of the plant *Glycyrrhiza uralensis* or commonly known as licorice. This plant has been attributed antiviral, cytotoxic, antimicrobial, enzyme inhibitory, anti-inflammatory, antioxidant, and analgesic properties. There are reports describing that extracts of this plant have been used in ancient medicine for the treatment of diseases such as cough, asthma, lung pathologies, thorax diseases, liver diseases, intestinal disorders, stomach, indigestion, arterial diseases, diseases of the urinary system, diseases of the urinary bladder, kidney pain, expulsion of kidney stones, wounds, ulcers, granulomas, eye diseases and fever. There are also documented cases where extracts of the plant have been used for ulcer healing and for the treatment of spasmodic pain caused by chronic gastritis.

It has also been documented for use as antineoplastic agent in melanoma and gastric cancer, with anti-atherogenic activity, antioxidant effects, hypolipidemic effects, treatment of atopic dermatitis. In in vitro experiments, it has demonstrated its ability as an antiviral agent against hepatitis B virus, Epstein Barr virus, severe acute respiratory syndrome (SARS), coronavirus, Japanese encephalitis virus, human immunodeficiency virus (HIV) and herpes simplex virus.

There are some formulations on the market with GA as the active ingredient for the treatment of HPV and related diseases. For example, the EPIGEN® formulation is a solution containing in its composition GA in a concentration of 0.001 g/mL, labeled as an antiviral agent especially for the treatment of HPV infection, indicated for Herpes Simplex type 1 (labial), Herpes Simplex type 2 (genital) and Herpes Zoster infections.

Some patent applications mention formulations with GA as active ingredient, for example, the MX B351117 Patent describes a formulation composed of GA in an amount of a 0.01 to 0.2 g/mL, thermo-reversible polymer, POE-POP-POE type at 20 to 30%, trichloroacetic acid at 0.5 to 2.0%, methyl paraben and propylene glycol. Mexican application PA/E/2006/019396 mentions a formulation composed of PF-127 (20-30%), GA at concentrations of 0.001 to 0.5 g/mL and propylene glycol.

Although many of the pharmacological properties are attributed to GA, certain pharmacological activities are due to 18β-glycyrrhetinic acid (18β-GA), which is the aglycone resulting from the hydrolysis of GA. When the GA is administered orally there is no bioavailability of the GA, however, it is absorbed in the form of 18β-GA after its hydrolysis by intestinal bacteria. This suggests that, for the treatment of certain conditions, 18β-GA is the functional active compound and not GA. 18β-glycyrrhetinic acid (18β-GA) is a pentacyclic triterpenoid, its molecular formula is $C_{30}H_{46}O_4$. It is known by the names (20β)-3β-hydroxy-11-oxo-olean-12-en-29-oic acid, (3(3β,20β)-3-hydroxy-11-oxo-olean-12-en-29-oic acid, 3β-hydroxy-11-oxoolean-12-en-30-oic acid, 18β-glycyrrhetic acid, 18β-glycyrrhetinic acid, biosone, enoxolone, glycyrrhetic acid, glycyrrhetin, glycyrrhetinic acid, GM 1658, NSC 35347, olean-12-en-29-oic acid, 3-hydroxy-11-oxo-, (3β,20β)-, olean-12-en-30-oic acid, 3β-hydroxy-11-oxo-, PO 12, STX 352, subglycyrrhellic acid, uralenic acid. There are two stereoisomers of glycyrrhetinic acid, 18α- and 18β. Although some pharmacological properties of the 18α stereoisomer are known, generally this compound is more toxic to humans, so the 18β-GA stereoisomer is the one commonly used for therapeutic purposes.

Although both GA and 18β-GA compounds are attributed with the same general pharmacological properties, e.g., anticancer, anti-inflammatory, antimicrobial, antiviral, immunoregulatory, among others, these are due to different biological and molecular mechanisms depending on the pathology in question. For example, in the case of anticancer properties, it is known that GA acts through the inhibition of enzymes such as thromboxane synthetase, HMGB1 (High-Mobility Group Box 1 protein) and TNF-α protein.

Likewise, it is known that GA induces apoptosis in cancer cells through the caspases and mitochondria-dependent pathway. In the case of 18β-GA, it acts by decreasing the expression of proteins such as NF-κ, vascular endothelial growth factor and MMP-9 protein. Also the compound is known to induce apoptosis and cell cycle arrest in the G2 phase.

In the case of the antiviral effect, it is known that each compound acts differently for each type of virus. An antiviral effect of GA has been observed on Hepatitis C virus (HCV) titers by preventing the release of infectious viral particles resulting in a 50% reduction, and prevents the virus from entering the cell. Demonstrating that GA inhibits the expression of the core gene of the HCV 3A at both the mRNA and protein levels. It has been reported that GA inhibits the replication of herpes simplex virus type 1 in human cells, and inhibits HIV replication. Moreover, it inhibits herpes simplex virus (HSV) by decreasing cell adhesion, and inhibits influenza virus by preventing the interaction of viral macromolecules and proteins of the infected cell. In addition, it is known to inhibit HIV by preventing its replication and to inhibit the H5N1 virus by controlling the proinflammatory response that it provokes and needs in order to replicate.

As for 18β-GA, this compound is known to interfere with Rotavirus replication up to 99% of infection when tested on infected cultures, by reducing the number of viral proteins VP2, VP6 and NSP2. It also inhibits HIV-1 by reducing the accumulation of viral antigen p24 and protecting cells from the cytopathological action of the virus.

These differences in mechanisms of action suggest that for a given pathology, the two drugs can have different mechanisms and treatment performances. For example, for the treatment of HPV infections, precancerous lesions and cervical cancer our experiments demonstrate that 18β-GA has a better therapeutic effect than GA, when comparing their cytotoxic effect in different cell lines.

Therefore, the need arises to create formulations and pharmaceutical forms that have the drug 18β-GA, for the treatment of the conditions in question. One of the limitations of 18β-GA, is that it is a compound of difficult solubility in many pharmaceutically accepted solubilizing compounds, since it is insoluble in water. In addition, the compound has zero permeation in epithelial layers which makes it difficult to develop an effective formulation, as would be the case for use in the treatment of infections with epithelial tissue tropism. The infections of greatest public health concern are viral infections affecting the genitourinary tract. Some of these are caused by members of the Papillomaviridae, Herpesviridae, Flaviviridae, Rotaviridae families, etc.

Therefore, a clear need arises for a pharmaceutical form capable of permeating these epithelial layers in order to have an effect in decreasing and/or inhibiting the disease.

The vaginal drug delivery systems include solutions, semisolids (creams, ointments, and gels) and solid formulations (tampons, capsules, tablets, suppositories, films, sponges, powders, and controlled-release drug delivery devices such as vaginal rings). The efficacy of these delivery systems will depend on their ability to achieve the appropriate local drug concentration at the site of action, their mucoadhesive properties and their compatibility with the vaginal microbiota. In order to achieve a desired concentration, it must be achieved despite the variations intrinsic to this anatomical area such as epithelial thickness, changes in the physicochemical composition of the vaginal microenvironment that are a consequence of physiological conditions (menstruation, adolescence, infections, sociocultural habits, sexual activity, among others). On the other hand, vaginal secretions may reduce the bioavailability of the drug.

Given the above, it is necessary to have a formulation that is effective both in concentration and in a short time interval; that is, the formulation must have the capacity of adequate permeation in a short time.

For the case of 18β-GA, it is important to obtain a formulation whose permeation is increased, since the 18β-GA compound alone has undesirable physicochemical properties such as poor lipophilicity, poor bioavailability, and low water solubility, which drastically decrease their percutaneous absorption profile (Hao J., et al. Int J. Pharmaceut. 399, 102-108 (2010)) (Li, S., et al. Drug Dev. Ind. Pharm. 38, 855-865 (2012)). It is widely known that the penetration of a compound in the skin depends on the logarithm of the partition coefficient (log P), which is an indicator of the lipophilicity of a compound and its molecular weight. This is mainly caused by the lipophilic properties of the outer, dead layer of the skin: the stratum corneum. Compounds with a log P of about 1 to 4 and molecular weights below 500 Da can easily penetrate through the skin, and drugs used for topical application are designed accordingly. Although the molar mass of the 18β-GA is less than 500 Da, more precisely 470.7 Da, its log P value is quite high (6.574), therefore, a strategy to increase the permeability of 18β-GA is needed.

One way to increase drug permeability is through formulations that constitute micro- and nano-emulsions. An emulsion is a liquid system consisting of two or more immiscible liquids, in which droplets of one liquid (the dispersed phase) are dispersed in another liquid (the continuous phase), and the boundary between the two phases is known as the interface. On the other hand, micro- and nano-emulsions are emulsions with high surfactant and cosurfactant content, capable of forming dispersed, translucent liquid systems and whose main characteristic is their reduced particle size ranging from 1 nanometer (nm) to 1 micrometer (µm). They differ from other systems such as nanoparticles, liposomes, or vesicles, because these are solid or semi-solid particles dispersed in a liquid or gas phase. Due to their small particle size, nanoemulsions are formulations that can penetrate through different membranes or tissues and potentiate the bioavailability of the drug or drugs that have reduced permeability, either topically or orally.

There are some formulations and pharmaceutical forms for the treatment of HPV infections, precancerous lesions and cervical cancer that contain the 18β-GA as the active ingredient. For example, application MX/a/2017/010806 mentions a gel dosage form with a formulation comprising a POE-POP-POE-type thermoreversible gel, 18β-GA, a phytoalexin (resveratrol), a biguanide (metformin) and extract of *Lactobacillus* sp.

Using 18β-GA at a concentration of a 0.1 to 0.75 g/mL. In the above example, resveratrol is physicochemically unstable at room temperature (which reduces its half-life and compromises the shelf formulation). In addition, this formulation does not comprise a nanoemulsion, as it is only a gelled 18β-GA solution.

S. Li et. al. (Skin Pharmacol Physiol 2012; 25:257-268) mentions obtaining a formulation consisting of a hydrogel with a liposome system of 18β-GA and lysine on concentrations of 0.3 to 0.9% w/w and with particle sizes of 150 µm. Unlike a micro or nanoemulsion, liposomes are composed of phospholipids and are not necessarily suspended in an aqueous or oily phase.

Puglia C. et al. (Drug delivery, 2010, vol. 17, no. 3, p. 123-129.) mention a nanoemulsion of 18β-GA with particle sizes of 180 to 240 nm, a concentration of 0.5%, reduced stability and a permeability of 0.60±0.08 µg/h/cm2, intended for use as an anti-inflammatory.

BRIEF DESCRIPTION OF THE INVENTION

The present invention relates to a nanoemulsion that potentiates the bioavailability of 18β-GA upon absorption at the spot or area of application, due to the effect of the composition of excipients (formula) which in combinations form nanoemulsions with polarity, structure and particle size from 1 to 500 nm, preferably from 1 to 50 nm, and from 500 to 1000 nm, preferably from 600 to 700 nm, capable of enhancing permeability, and consequently the bioavailability of the drug on the application tissue.

Such nanoemulsion can be gelled to improve retention at the area of application for the treatment of certain conditions, e.g., HPV skin infections, cervical intraepithelial lesions, and cervical cancer. The pharmaceutical forms of the present invention exhibit specific permeability values, diffusion coefficient, specific polydispersity which help the invention to provide its technical advantages.

The formulations and pharmaceutical forms according to the present invention are solutions, micro- and nanoemulsions having a high concentration of 18β-GA, and a reduced particle size, as compared to other previously reported formulations. Although formulations have been reported with equal or higher concentrations of the active ingredient or micro- and nanoemulsions with 18β-GA, the formulation of the present invention combines a high concentration of the active compound, a micro- or nano-emulsion and excipients that allow for enhanced permeation. The combination of these properties gives the present formulation superior permeation and stability properties, not previously reported in the literature.

The present invention relates to nanoemulsions with a high permeation by the combined effect of the reduced particle size, the high concentration of the active compound, the structural composition of its polar micelles and the emollient effect of its excipients, mainly adapted for its optimal application in the vaginal-cervical tract, for the treatment of various diseases related to infections, preneoplastic lesions and cervical cancer.

The present invention corresponds to formulations, preferably solutions, micro y nanoemulsions containing 18β-GA as active ingredient, solubilizing elements such as diethylene glycol derivatives, propylene glycol or polyethylene glycol derivatives, surfactant elements such as polyoxyglycerides of capric, lauric, linoleic, oleic acid, or stearic acid triglycerides, one or more ethoxylated fatty alcohols as cosurfactants and an emollient oleaginous vehicle such as isopropyl myristate.

These formulations have high permeation properties due to their reduced particle size, structural composition and polarity of the micelles formed in the nanoemulsion, by modifying the structure of the skin tissue in the area of application. These formulations contain the drug in concentrations ranging from 0.001% to 30% by weight (0.0001 to 0.3 g/mL). Among the different compositions and pharmaceutical forms derived from such formulations aerosols, nebulizers, solutions, sterile solutions, foams, lyophilized products, solids, soft gelatin capsules, implants, transdermal patches, and gels are included. Of these pharmaceutical forms, gels in particular are intended for use and application in the treatment of diseases related to viral infections such as human papillomavirus and thus, of cancer as well. Additionally, gels are designed to increase their absorption within the application area by mucoadhesive effect at viscosities comprising from to 1500 to 2500 cP (centipoise) and presenting a pH of 3.8 to 6.5, preferably from 4.5 to 5.5, since their properties such as high permeation and viscosity enhance the bioavailability of the drug, thus helping the drug to have a better effect and in less time.

Figure 1:
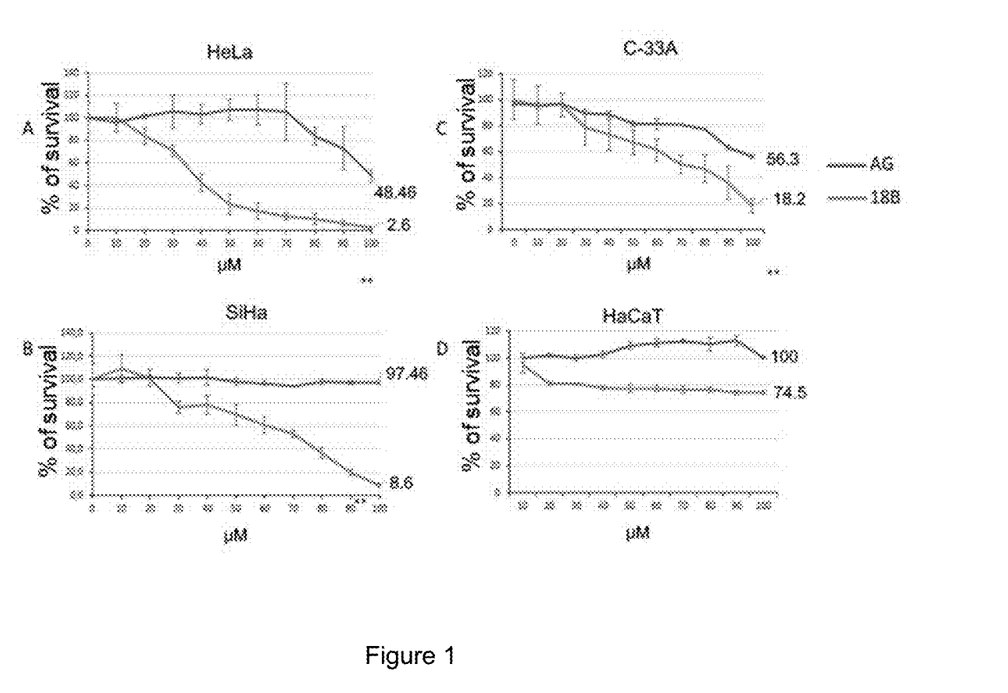
FIG. 1 shows the percentage of cancer cell survival and HPV infection upon exposure to GA and 18β-GA drugs. It shows that 18β-GA has a broader and stronger cytotoxic effect compared to GA.

GA and 18β-GA are different active ingredients but have been suggested as equivalent by some authors. In this sense, a cell survival inhibition assay of different cell lines was carried out when exposed for hours 24 to one of the two drugs from FIG. 1. In this experiment, four cell lines were tested: HeLa, which are cell lines representative of cancer and HPV-18 infection, SiHa which are cells representative of cervical cancer with HPV-16 infection, C-33A which are cells representative of HPV-negative cervical carcinoma, and HaCaT, which are cancer and infection negative cells. The experiment consisted of exposing cells of the different cell lines to different concentrations of both drugs for 24 hours (10-100 µM) going in steps of 10 µM each. The results demonstrate that, for the cell lines representative of HPV infection and cervical cancer, 18β-A has overall a greater therapeutic effect compared to the effect of GA, which shows a minor effect in inhibiting cell survival (HeLa and C-33A cell lines) or no effect as in the case of the SiHa cell line. These results as a whole, suggest that for the treatment of conditions such as HPV infection and cervical cancer, 18β-GA has a greater effect than GA in decreasing the survival of cancer cell lines.

Figure 2:
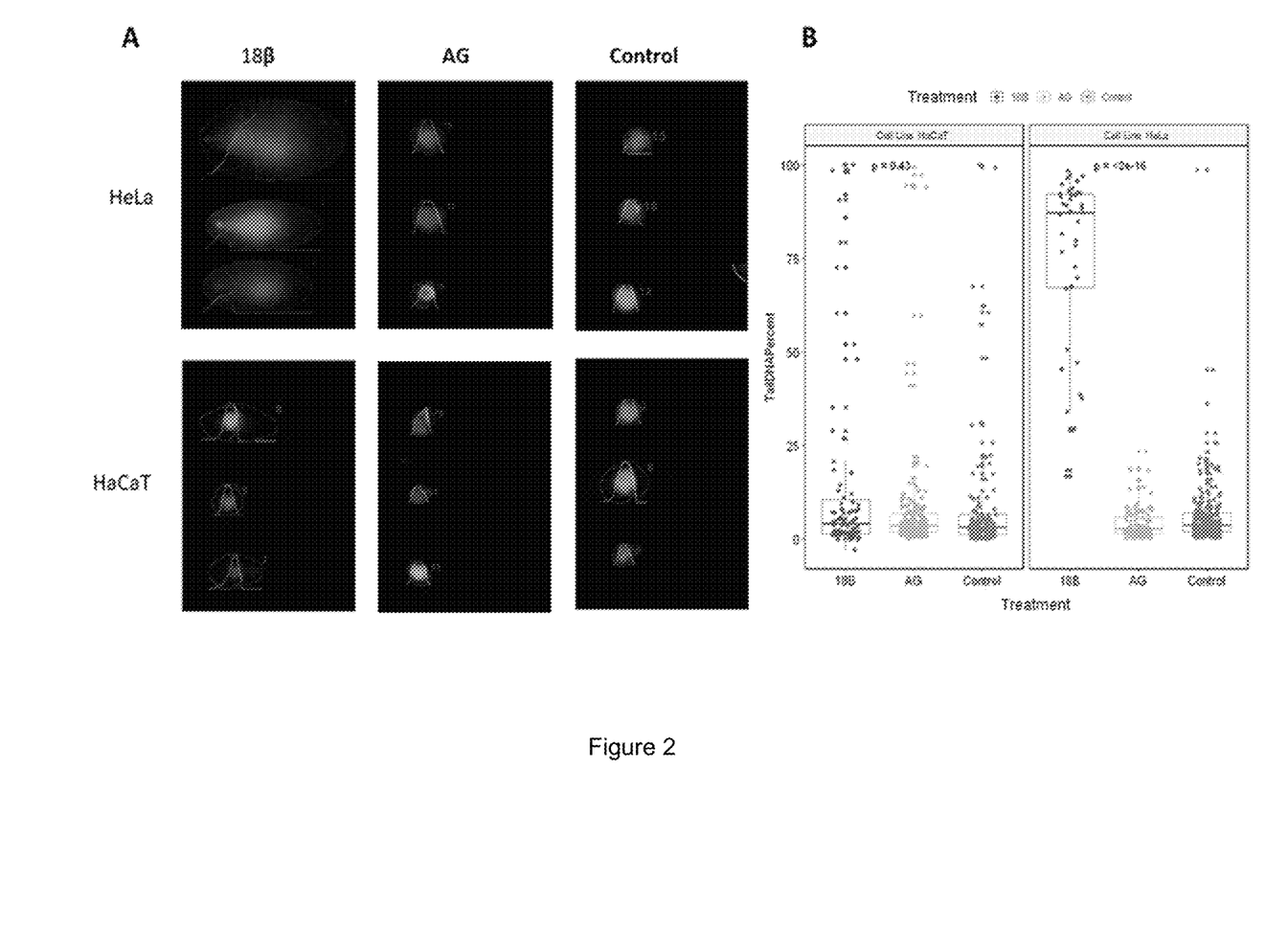
FIG. 2 depicts representative tail-DNA percentage data. (A) Microphotographs of the alkaline comet assay showing representative images of the CC cell lines and their negative control with their 18β and GA treatments of HeLa (HPV 18 cervical cancer) and HaCaT (HPV negative immortalized keratinocyte) (B) Comet assay data plot of Tail-DNA percentage **P<0.43 for HaCaT and P<$2^{-16}$. Larger comets for 18β treatment are observed.
Figure 3:
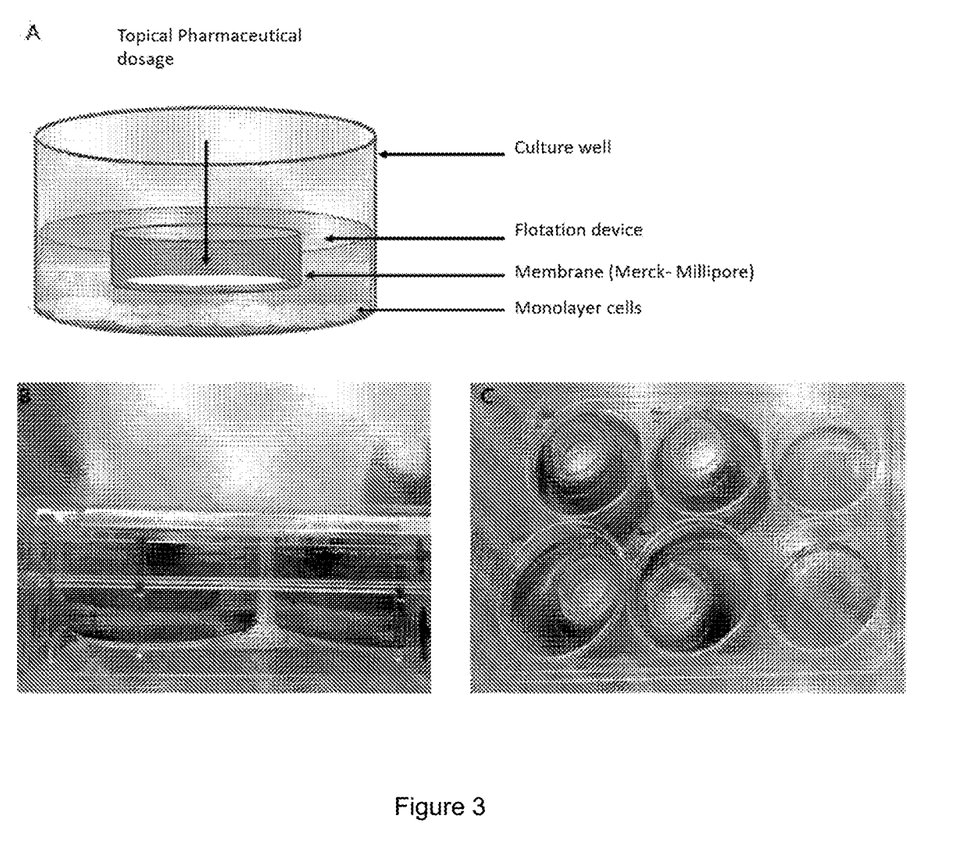
FIG. 3 shows the in vitro permeability test; (A) Schematic drawing of the experiment, the assembly of the skin tissue simulation membrane is shown, to test the permeation and biological effect of the different formulations. The system consists of a culture well, with cells in $1\times10^6$ monolayer. Inside the well 8-10 mL of culture medium are placed and a device that has the ability to float on the medium; on the inside of the device there is a Millipore Strat-M® membrane with a pore size designed to simulate skin conditions and it is hermetically sealed. The pharmaceutical form to be tested is placed inside the flotation device with the membrane already in place. If the pharmaceutical form permeates the membrane, a greater effect on cell survival will be observed.
Figure 4:
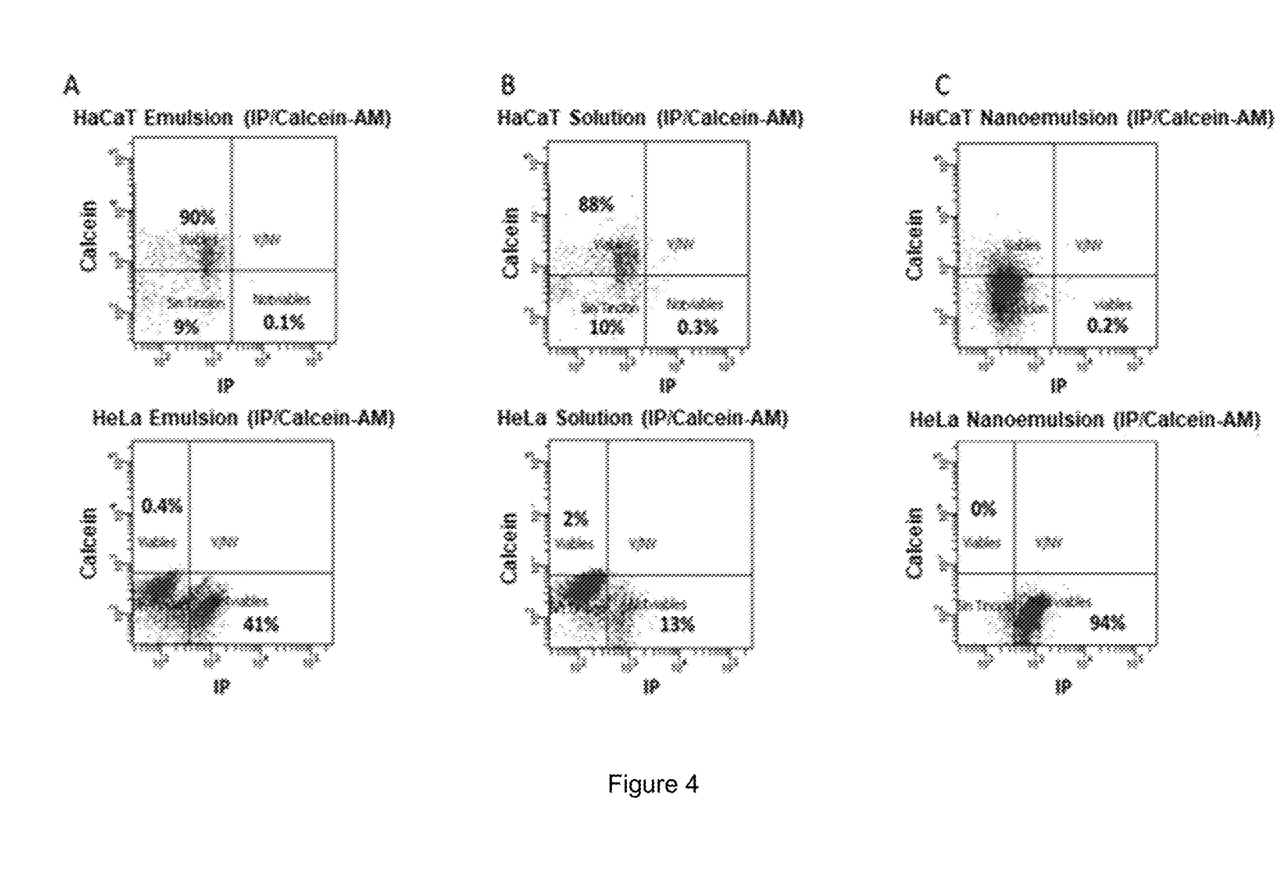

This difference in drug performance can be explained by the difference in their mechanisms of action. FIG. 2 shows the results of a comet assay or single cell electrophoresis assay. The comet assay is an experiment that allows to see if the drug has a cytotoxic effect related to DNA fragmentation of the cells. This difference is visualized by the size of the "tails" of the "comets", which is the fragmented DNA from the cells under study. As can be seen in FIG. 2A, 18β-GA generates considerable DNA fragmentation in (HeLa) cancer cells treated with the drug.

Comparatively, healthy (HaCaT) cells show much less fragmentation when treated with the drug. On the other hand, both cancer cells (HeLa) and healthy cells (HaCaT) treated with GA do not present this fragmentation. FIG. 2B shows the graphs and statistical analysis of the results of this test. An analysis with a Wilcoxon test was performed to verify whether the means in the percentage of DNA in the comet tails of the different cell lines differ. For the case of the HaCaT control cell line, the value of P>0.05 indicates that there is no difference between the different treatments in that cell line. In the case of the HeLa cell line, the value of P<0.05 indicates a difference in the effect of the different treatments applied to that cell line, especially 18β-GA. In conclusion, these experiments make it clear that 18β-GA has a selective cytotoxic effect on cancer cells, causing DNA fragmentation by programmed cell death or 18β-induced apoptosis; unlike GA, where the aforementioned effect on the treated cells did not occur.

BRIEF DESCRIPTION OF THE FIGURES

FIG. 4 depicts the flow cytometry of the in vitro permeability assays; (A-C) Results show cell survival and cell death data from experiments performed with the setup displayed in FIG. 3. Quantification of viable and nonviable cells was determined by flow cytometry by Live/Dead Cell Double Staining Kit (Sigma) live/dead cell analysis. The results show that HeLa cervical cancer cell cultures exposed to the emulsion and nanoemulsion have a higher proportion of non-viable cells (41-94% non-viable cells, respectively), compared to a solution (13%). On the other hand, control cells (HaCaT) do not show a significant decrease in the proportion of viable cells when exposed to any of these three formulations (0.1-0.3% non-viable cells). Overall, it is shown that, the higher the permeability of the active compound, the better the cytotoxic effect on cancer cells.

DETAILED DESCRIPTION OF THE INVENTION

The present invention refers to a nanoemulsion that potentiates the bioavailability of 18β-GA, when absorbed on the spot or area of application to be treated by effect of its reduced particle size of 1 to 100 nm and 500 to 1000 nm, preferably at a concentration of 0.01% to 30% and a particle or micelle size of 1 to 500 nanometers, preferably from 1 to 50 nm, preferably from 1 to 20 nm in one embodiment, and from 500 to 1000 nanometers, preferably from 600 to 700 nm in another embodiment. The formulation comprises the active ingredient glycyrrhetinic acid (18β-GA), a solubilizing element such as diethylene glycol derivatives, propylene glycol derivatives, or polyethylene glycol derivatives, a surfactant element such as a polyoxylglyceride, e.g., polyoxylglyceride from capric, lauric, linoleic, oleic acid, or of triglycerides of stearic acid, a cosurfactant such as one or more ethoxylated fatty alcohols, for example, alcohols with the structure R—(OCH$_2$CH$_2$)$_n$—OH where R is an alkyl chain with a size of 12 to 18 carbons and n represents the moles of ethylene oxide, which can have a value of 2 to 25 and an emollient oleaginous vehicle, e.g., isopropyl myristate. The combination of the various excipients with the drug generates micelles with a polar structural composition that improve the bioavailability of the active ingredient by contributing to the permeation of the formula. Likewise, the excipients used in the formulation help synergistically to increase permeation, due to the emollient effect of some of them.

The pharmaceutical forms in accordance with the present invention present a permeation value of 0.6 to 47.8 μg/h/cm$^2$, wherein the composition has a diffusion coefficient of 0.003 to 1.5 μm$^2$/s and a polydispersity of 2 to 50.

Such formulation can be used in a liquid and packaged form in various presentations for the treatment of different diseases for which 18β-GA is known to have a therapeutic effect. Likewise, the nano-emulsion can be gelled, with the aid of certain excipients for convenient application in the treatment of certain conditions such as injuries, viral infections, and the treatment of certain cancers.

The present invention provides a series of formulations containing 18β-GA, in combination with other excipients suitable for each pharmaceutical formulation. In summary, the formulation is composed of diethylene glycol derivatives, polyoxyglycerides, an oleaginous vehicle, fatty alcohols and their derivatives, castor oil and silicon dioxide, as well as preservatives and stabilizers.

The formulations address the need for formulations whose active ingredient is 18β-GA in concentrations from 0.001 to 30% by weight with high permeation of the active ingredient. The different formulations are intended for its administration through various routes, such as oral, inhaled, injectable and topical.

In one embodiment of the invention the formulation is a solution of 18β-GA, comprising a solubilizing element, for example, diethylene glycol, propylene glycol or polyethylene glycols derivatives, preferably 2-(2-ethoxyethoxy)-ethanol, a stabilizing element, e.g., polyoxylglycerides of capric, lauric, linoleic, oleic acid, or stearic acid triglycerides, and an emollient oleaginous vehicle, e.g., isopropyl myristate. In another embodiment, in addition to the above components, the mixture can contain one or more ethoxylated fatty alcohols or their derivatives, as well as castor oil or a derivative thereof, such as castor oil polyoxyethylenes as stabilizing elements.

In a preferred embodiment, the method of preparation of the solution consists of mixing the components of the formula and heating this mixture until the active ingredient is solubilized. Once the dissolution of the active ingredient is completed, it is cooled to room temperature with constant stirring. The components of the mixture are in a w/w percentage (weight percentage) from 0.001 to 30%, preferably from 0.001 to 5% for the 18β-GA, 40 to 60% for the diethylene glycol derivative, 1 to 15% for the polyoxylglyceride, 10 to 20% for the oleaginous vehicle or emollient, 0 to 15% for the ethoxylated fatty alcohol and 0 to 20% for castor oil or its derivatives.

In another embodiment of the invention the formulation is an emulsion, wherein the emulsion comprises a diethylene glycol derivative, preferably 2-(2-ethoxyethoxy)-ethanol, an emollient oleaginous vehicle, for example, isopropyl myristate, castor oil or a derivative thereof and distilled water. In a preferred embodiment the method of preparation is a reverse phase inversion emulsion. In such a method the components are mixed in w/w percentages from 40% to 60% for the diethylene glycol derivative, 10% to 20% for the oleaginous vehicle, 0% to 20% for the castor oil or its derivatives, and 0% to 15% for the ethoxylated fatty alcohol. To these components, the active ingredient 18β is added in a w/w concentration of from to 0.001 to 30%, preferably from 0.001 to 5%. The mixture is kept under stirring and heated until the active ingredient is dissolved. Once the active ingredient is dissolved, distilled water is added in the necessary amount, ranging from 5 to 50% by weight of the total mixture.

In another embodiment of the invention the formulation is a nano-emulsion, which is composed of a diethylene glycol derivative, preferably 2-(2-ethoxyethoxy)-ethanol, a polyoxylglyceride of capric, lauric, linoleic, oleic acid, or stearic acid triglycerides, an oleaginous vehicle or emollient, for example, isopropyl myristate and distilled water. In a preferred embodiment the method of preparation, it is a reverse phase inversion emulsion. In such a method the components are mixed in w/w percentages from 40% to 60% for the diethylene glycol derivative, 10% to 20% for the oleaginous vehicle and 0 to 15% for the ethoxylated fatty alcohol. To these components, the active ingredient 18β-GA is added in a w/w concentration of 0.001 to 30%, preferably of 0.001 to 5%. The mixture is maintained under stirring and heated until the active ingredient is dissolved. Once the active ingredient is dissolved, distilled water is added in the necessary amount, ranging from 5 to 50% by weight of the total mixture with the above-described process, a nano-emulsion is obtained, with variable particle sizes depending on the excipients used. The increased permeability of the different formulations is achieved thanks to the combined action of the different components of the formulation. Specifically, there are three elements that provide the increased permeability:

The solubilizing element, in this case the diethylene glycol derivative, referentially 2-(2-ethoxyethoxy)-ethanol helps to achieve a high solubility of the active compound 18β-GA and thus increases the concentration of it in the formulation and consequently, it provides a higher permeation.

The surfactant and cosurfactant elements, in this case fatty alcohols and their derivatives, for example alcohols with the general structure $R-(OCH_2CH_2)_n-OH$ where R is an alkyl chain with a size from 12 to 18 carbons and n represents the moles of ethylene oxide, which can have a value of 2 to 25, which help to give the particles their micellar structure with polarity. The amphipathic nature of these compounds helps, on the one hand, the lipophilic part of the fatty alcohols to encapsulate the diluent, in this case the diethylene glycol derivative, e.g. 2-(2-ethoxyethoxy)-ethanol, with the active compound in the micelles, and on the other hand, the polar hydrophilic part of the alcohols helps the dispersion of the particles or micelles in the aqueous and oily phases of the medium, preventing their agglomeration due to the electrostatic repulsion between particles, thus granting stability to the formula. In addition, the polar nature of the particles helps the particles to pass through the different cellular layers that make up the tissue in the area of application.

The emollient element of the oil phase, in this case the oleaginous vehicle, e.g., isopropyl myristate. Its activity as an emollient helps to improve the permeability of substances through the skin, as it has the effect of softening the outer layers of the skin, by moisturizing them.

In a preferred embodiment, the particle sizes of the micro-emulsion and nano-emulsion are in the range of 1 nm to 500 nm (nm nanometers), preferably from 1 to 50 nm, preferably from 1 to 20 nm. In another preferred embodiment, particle sizes are in the range of from 500 to 1000 nm, preferably from 500 to 700 nm, preferably from 500 to 600 nm.

The present invention also provides a method for the preparation of solutions, emulsions and gelled nanoemulsions formulations, wherein the method comprises the steps of:

A solution, emulsion or nano-emulsion is prepared as described in the previous steps.

Gelling elements and/or excipients are added.

The mixture is subjected to stirring. Preservatives and stabilizers are added.

The pH is adjusted according to the pharmacological application, being this setting preferably from 4 to 5 for the case of vaginal application.

In a preferred embodiment, the excipients and gelling elements are: cellulose derivatives, e.g., hydroxypropyl cellulose (HPC), hydroxyethyl cellulose (HC) or hydroxypropyl methyl cellulose (HPmC), acrylic acid polymers or a member of the poloxamer family.

In a preferred embodiment the preservative and stabilizing agents may be: Butylated hydroxytoluene (BHT) (antioxidants), butylated hydroxyanisole, L-cysteine, propylparaben, methylparaben, benzalkonium chloride, sodium benzoate and benzoic acid.

In certain preferable but non-limiting embodiments, the various components of the above formulations are in a non-limiting manner:

Diethylene glycol derivative: 2-(2-ethoxyethoxy)-ethanol

Polyoxylglycerides: polyoxylglyceride of capric, lauric, linoleic, oleic acids, or stearic acid triglycerides.

Oleaginous vehicle o emollient: Isopropyl myristate.

Fatty alcohols and their derivatives: alcohols with the general structure $R-(OCH_2CH_2)_n-OH$ where R is an alkyl chain with a size from 12 to 18 carbons and n represents the moles of ethylene oxide, which may have a value of a 2 to 25.

Anti-crystalline agent: polyvinylpyrrolidone in its different degrees of polymerization and cyclodextrins.

The following are representative, but not limiting examples of the formulations described above:

Example 1

In a preferred embodiment, the invention refers to a solution with the composition:

18β-GA: 5.5%.

2-(2-ethoxyethoxy)-ethanol: 94.5%.

Which is prepared by dissolving the active compound, 18β, in 2-(2-ethoxyethoxy)-ethanol, the mixture is heated in a range from 50 to 80 degrees Celsius, preferably from 60 to 70 degrees Celsius and is subjected to stirring, until dissolving the active ingredient. The resulting solution has a permeation of 0.6 μs/h/cm2.

Example 2

In another preferred embodiment, the invention relates to an emulsion, with a composition of:
18β-GA: 4.4%.
2-(2-ethoxyethoxy)-ethanol: 71.6%.
Isopropyl myristate: 12%.
Distilled water: 12%.

The method of preparation consists of mixing 2-(2-ethoxyethoxy)-ethanol and isopropyl myristate, the mixture is heated between 50 to 80 degrees Celsius, preferably from 60 to 70 degrees Celsius. Once the desired temperature is reached the mixture is subjected to stirring and the 18β-GA is added. Once the active ingredient is dissolved, distilled water is added to the mixture, stirring is stopped and the mixture is allowed to cool to room temperature. The resulting emulsion has a permeation of 1.8 μs/h/cm2, a particle size of 2500 nm, a hydrodynamic radius of 2850 nm, a diffusion coefficient of 1.26 μm$^2$/s and a polydispersity of 39.8.

Example 3

In another preferred embodiment, the invention relates to a nano-emulsion, with a composition of:
18β-GA: 5%.
2-(2-ethoxyethoxy)-ethanol: 53%.
R—(OCH$_2$CH$_2$)$_n$—OH, where R is a 12-carbon alkyl and n is equal to 9: 2.5%.
Hydrogenated castor oil: 6.5%.
Isopropyl myristate: 15%.
Distilled water: 18%.

The method of preparation consists of mixing 2-(2-ethoxyethoxy)-ethanol, the 12-carbon ethoxylated fatty alcohol, the hydrogenated Castor Oil and the isopropyl myristate. The mixture is heated to a temperature of 50 to 80 degrees Celsius, preferably from 60 to 70 degrees Celsius. Once the desired temperature is reached, the mixture is subjected to stirring and the 18β-GA is added. Once the active ingredient is dissolved, distilled water is added to the mixture, the stirring is stopped, and it is allowed to cool to room temperature. The resulting nano-emulsion has a permeability of 2.8 μg/h/cm$^2$, particle size of 789 nm, a hydrodynamic radius of 820 nm, a diffusion coefficient of 0.0038 μm$^2$/s and a polydispersity of 26.

Example 4

In another preferred embodiment, the invention relates to a nano-emulsion, with a composition of:
18β-GA: 4.5%.
2-(2-ethoxyethoxy)-ethanol: 54%
R—(OCH$_2$CH$_2$)$_n$—OH, where R is a 12-carbon alkyl and n is equal to 9: 3.1%
Caprylocaproyl polyoxyl-8 glyceride: 14.4%.
Isopropyl myristate: 12%.
Distilled water: 12%.

The method of preparation consists of mixing the 2-(2-ethoxyethoxy)-ethanol, the 12-carbon ethoxylated fatty alcohol, the Caprylocaproyl polyoxyl-8-glyceride and the isopropyl myristate. The mixture is heated to a temperature of 50 to 80 degrees Celsius, preferably from 60 to 70 degrees Celsius. Once the desired temperature is reached, the mixture is stirred, and the 18β-GA is added. Once the active ingredient is dissolved, distilled water is added to the mixture, stirring is stopped and the mixture is allowed to cool to room temperature. The resulting nano-emulsion has a permeability of 8 μg/h/cm2, a particle size of 678.13 nm, a hydrodynamic radius of 750 nm, a diffusion coefficient of 0.0029 μm$^2$/s and a polydispersity of 2.3.

Example 5

In another preferred embodiment, the invention refers to a nano-emulsion, with a composition of:
18β-GA: 3.9%.
2-(2-ethoxyethoxy)-ethanol: 44%.
R—(OCH$_2$CH$_2$)$_n$—OH, where R is a 12-carbon alkyl and n is equal to 9: 3%.
Caprylocaproyl polyoxyl-8 glyceride: 13%.
R—(OCH$_2$CH$_2$)$_n$—OH, where R is an 18-carbon alkyl and n is equal to 5: 10.6%.
Isopropyl myristate: 18%
Distilled water: 7.5%.

The method of preparation consists of mixing the 2-(2-ethoxyethoxy)-ethanol, the 12-carbon ethoxylated fatty alcohol, the 18-carbon ethoxylated fatty alcohol, the Caprylocaproyl polyoxyl-8 glyceride and isopropyl myristate. The mixture is heated to a temperature of 50 to 80 degrees Celsius, preferably from 60 to 70 degrees Celsius. Once the desired temperature is reached, the mixture is subjected to stirring and the 18β-GA is added. Once the active ingredient is dissolved, distilled water is added to the mixture, stirring is stopped and the mixture is allowed to cool to room temperature. The resulting nano-emulsion has a permeability of 47.85 μg/h/cm2, a particle size of 7.08 nm, a hydrodynamic radius of 21.16 nm, a diffusion coefficient of 0.067 μm$^2$/s, and a polydispersity of 47.9, the same example sampled only 24 hours, without using stirring in the Franz cell and quantifying through HPLC coupled to UV (C18/5 μm/25 cm, λ: 250 nm, Sodium Acetate-Tetrahydrofuran pH 4.8) obtained a recovery of 276.07+9.08 μg/mL (2.62±0.09 mg/cm2) equivalent to 5.75±0.19 μg/h/cm2, which shows that the use of dynamic systems (stirring) in the receiving medium of the Franz cell favors the diffusion of the drug through the membranes under evaluation, the same systems used by several authors such as S. Li et al. Medium: PBS 7.4 Speed: 280 rpm (Skin Pharmacol Physiol 2012; 25:257-268), PUGLIA C. et al. Medium: Ethanol-Water (50:50) Speed: 500 rpm (Drug delivery, 2010, vol. 17, no 3, p. 123-129.). As a physicochemical challenge to the generated nano-emulsion, it was subjected to 15 stress cycles that comprised a heating of 50° C./22.5 hours with centrifugation periods at 4000 rpm/90 min/4° C. for a period of 15 days, obtaining no significant changes with respect to the particle size of the nano-emulsion generated.

Example 6

In another preferred embodiment, the invention refers to a nano-emulsion, with a composition of:
18β-GA: 5%.
2-(2-ethoxyethoxy)-ethanol: 55.5%.
Hydrogenated castor oil: 4%.
R—(OCH$_2$CH$_2$)$_n$—OH, where R is an 18-carbon alkyl and n is equal to 5: 15.5%.
Isopropyl myristate: 10%.

The method of preparation consists of mixing 2-(2-ethoxyethoxy)-ethanol, hydrogenated castor oil, 18-carbon ethoxylated fatty alcohol, Caprylocaproyl polyoxyl-8 glyceride and isopropyl myristate. The mixture is heated to a temperature of 50 to 80 degrees Celsius, preferably 60 to 70 degrees Celsius. Once the desired temperature is reached, the mixture is stirred, and the 18β-GA is added. Once the active ingredient is dissolved, distilled water is added to the mixture, stirring is stopped, and it is allowed to cool to room temperature. The resulting nano-emulsion has a permeability of 8 μg/h/cm2, a particle size of 7.54 nm, a hydrodynamic radius of 26.94 nm, a diffusion coefficient of 0.176 μm$^2$/s and a polydispersity of 37.14.

Example 7

In another preferred embodiment, the invention refers to a nano-emulsion, with a composition of:
18β-GA: 4.0%.
2-(2-ethoxyethoxy)-ethanol: 56%.
R—(OCH$_2$CH$_2$)$_n$—OH, where R is a 12-carbon alkyl and n is equal to 9: 3%.
R—(OCH$_2$CH$_2$)$_n$—OH, where R is an 18-carbon alkyl and n is equal to 5: 11.0%.
Isopropyl myristate: 18%.
Distilled water: 8.0%.

The method of preparation consists of mixing 2-(2-ethoxyethoxy)-ethanol, the 12-carbon ethoxylated fatty alcohol, the 18-carbon ethoxylated fatty alcohol and isopropyl myristate. The mixture is heated to a temperature of 50 to 80 degrees Celsius, preferably 60 to 70 degrees Celsius. Once the desired temperature is reached, the mixture is subjected to stirring and the 18β-GA is added. Once the active ingredient is dissolved, distilled water is added to the mixture, stirring is stopped and the mixture is allowed to cool to room temperature. The resulting nano-emulsion has a permeability of 2.36±0.75 μs/h/cm2, a particle size of 10.35 nm, a hydrodynamic radius of 37.7 nm, a diffusion coefficient of 12.98 μm$^2$/s and a polydispersity of 26.8, the above example denotes that the exclusion of the Caprylocaproyl polyoxyl-8 glyceride, with respect to example 5, reduces the permeation of the drug significantly (2.36 vs 47.85 μs/h/cm2), due to the change in polarity in the Nano-emulsion formed since the particles were of similar size in the two systems (10.5 vs. 7.08 nm).

Example 8

In another preferred embodiment, the invention relates to a nano-emulsion, with a composition of:
18β-GA: 4.3%.
2-(2-ethoxyethoxy)-ethanol: 47.1%.
Caprylocaproyl polyoxyl-8 glyceride: 13%.
R—(OCH$_2$CH$_2$)$_n$—OH, where R is an 18-carbon alkyl and n is equal to 5: 10.1%.
Isopropyl myristate: 18%.
Distilled water: 7.5%.

The method of preparation consists of mixing 2-(2-ethoxyethoxy)-ethanol, the 18-carbon ethoxylated fatty alcohol, the Caprylocaproyl polyoxyl-8 glyceride and the isopropyl myristate. The mixture is heated to a temperature of 50 to 80 degrees Celsius, preferably 60 to 70 degrees Celsius. Once the desired temperature is reached, the mixture is subjected to stirring and the 18β-GA is added. Once the active ingredient is dissolved, distilled water is added to the mixture, the stirring is stopped, and it is allowed to cool to room temperature. The resulting nano-emulsion has a permeability of 4.06 μg/h/cm2.

Example 9

In another preferred embodiment, the invention refers to a nano-emulsion, with a composition of:
18β-GA: 4.0%.
2-(2-ethoxyethoxy)-ethanol: 57%.
R—(OCH$_2$CH$_2$)$_n$—OH, where R is a 12-carbon alkyl and n is equal to 9: 3%.
Caprylocaproyl polyoxyl-8 glyceride: 13%.
R—(OCH$_2$CH$_2$)$_n$—OH, where R is an 18-carbon alkyl and n is equal to 5: 10.5%.
Isopropyl myristate: 5%.
Distilled water: 7.5%.

The method of preparation consists of mixing 2-(2-ethoxyethoxy)-ethanol, the 12-carbon ethoxylated fatty alcohol, the 18-carbon ethoxylated fatty alcohol, the Caprylocaproyl Polyoxyl-8 glyceride and the isopropyl myristate. The mixture is heated to a temperature of 50 to 80 degrees Celsius, preferably from 60 to 70 degrees Celsius. When the desired temperature is reached, the mixture is stirred, and the 18β-GA is added. Once the active ingredient is dissolved, distilled water is added to the mixture, the stirring is stopped, and the mixture is allowed to cool to room temperature. The resulting nano-emulsion has a permeability of 1.98 μg/h/cm2, this suggests that isopropyl myristate in proportions lower than those stated in example 5 decreases the permeation of the drug in the formed system, therefore, it is concluded that there is a dependence and synergism between the employed inputs and their proportions within the 18β-GA acid nano-emulsion.

Figure 5:
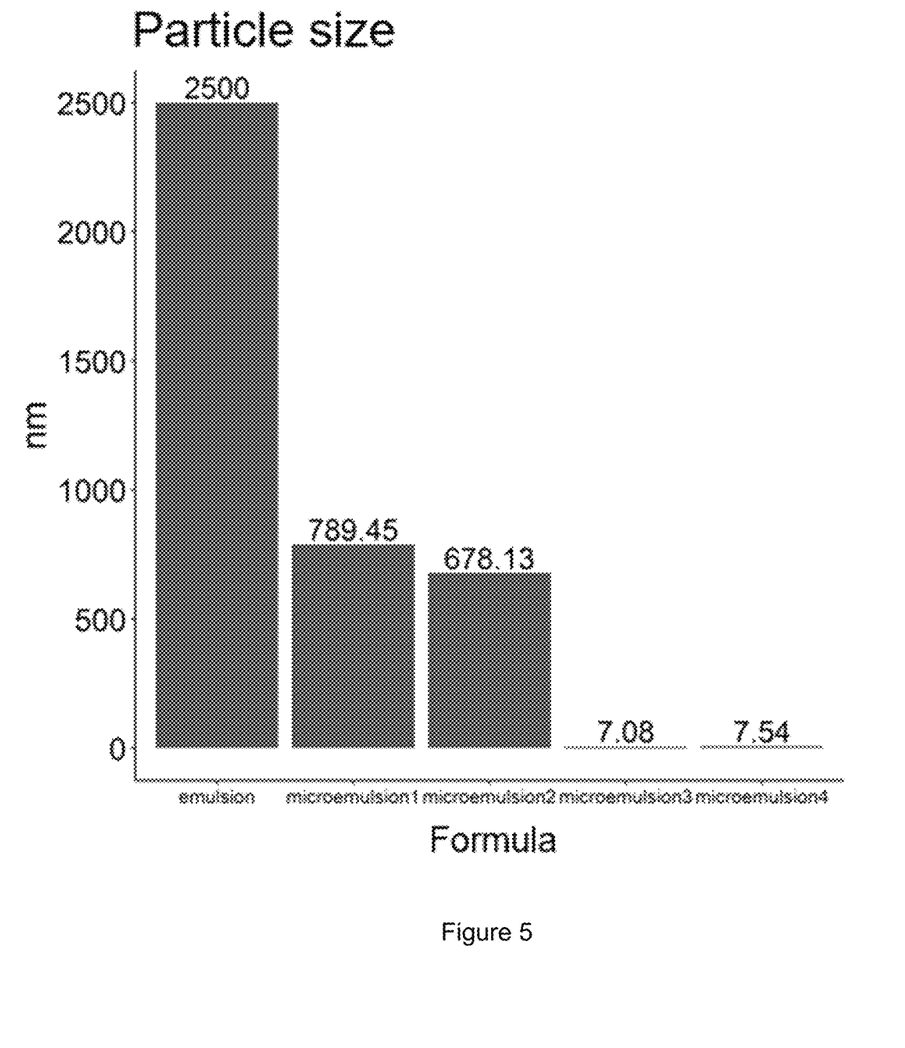
FIG. 5 shows the graph of the particle size averages of the different formulations. The averages of the different formulations with their different particle sizes over a wide range of sizes can be observed. Emulsion: 2500 nm; Nanoemulsion 1: 789.45 nm; Nanoemulsion 2: 678.13 nm; Nanoemulsion 3: 7.08 nm; Nanoemulsion 4 nm. The sizes depend on the ratio of the excipients used in the formulation, with the size not being linearly dependent on any specific component.
Figure 6:
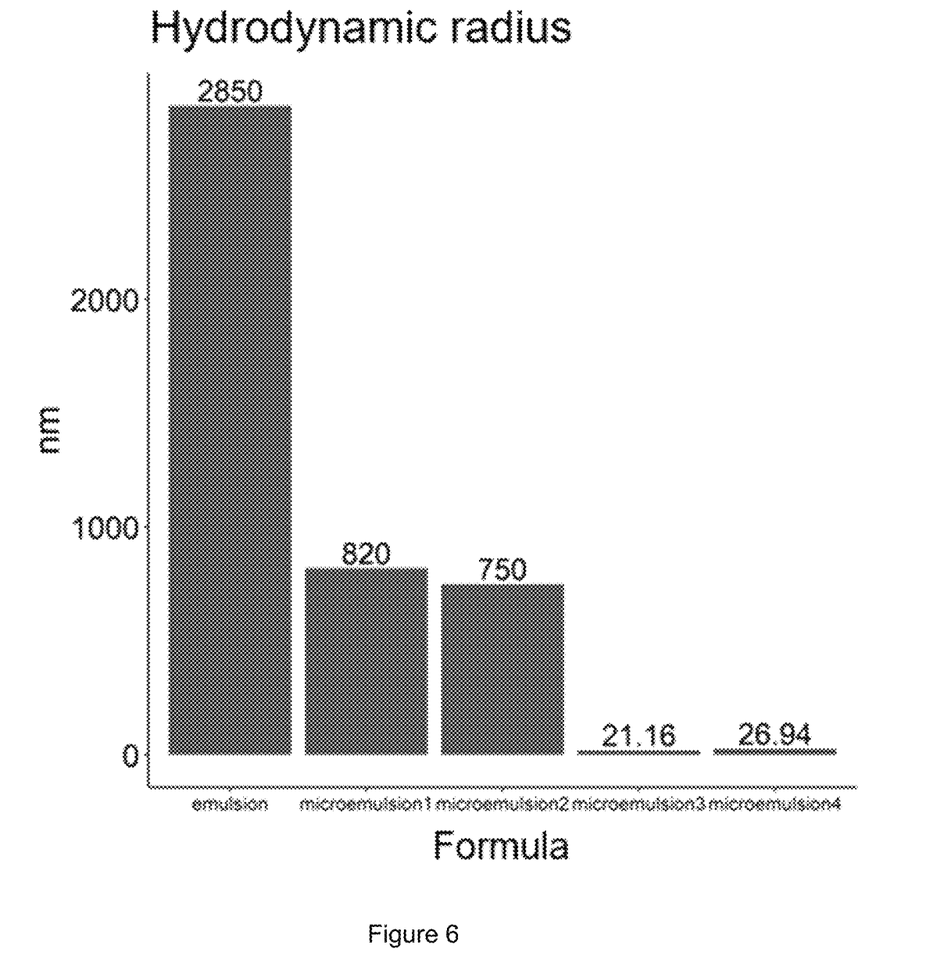
FIG. 6 shows the graph of the average hydrodynamic radii of the particles of the various formulations of the invention. Emulsion: 2850 nm; Nanoemulsion 1: 820 nm; Nanoemulsion 2: 750 nm; Nanoemulsion 3: 21.16 nm; Nanoemulsion 26.94 nm.

In this regard, FIG. 5 shows the different particle sizes of the different formulations exemplified above. The size was determined by means of the dynamic light scattering technique, with a Litesizer equipment, previously verified with a 220 nm polystyrene latex nanoparticle suspension. Depending on the composition of the formulation, different particle sizes are obtained, ranging, for the specific examples, from 7 nm in the case of the nanoemulsions to 2500 nm in the case of the emulsion. The FIG. 6 shows the hydrodynamic radii of the particles of the different formulations. This quantification was also obtained with the Litesizer equipment.

Figure 7:
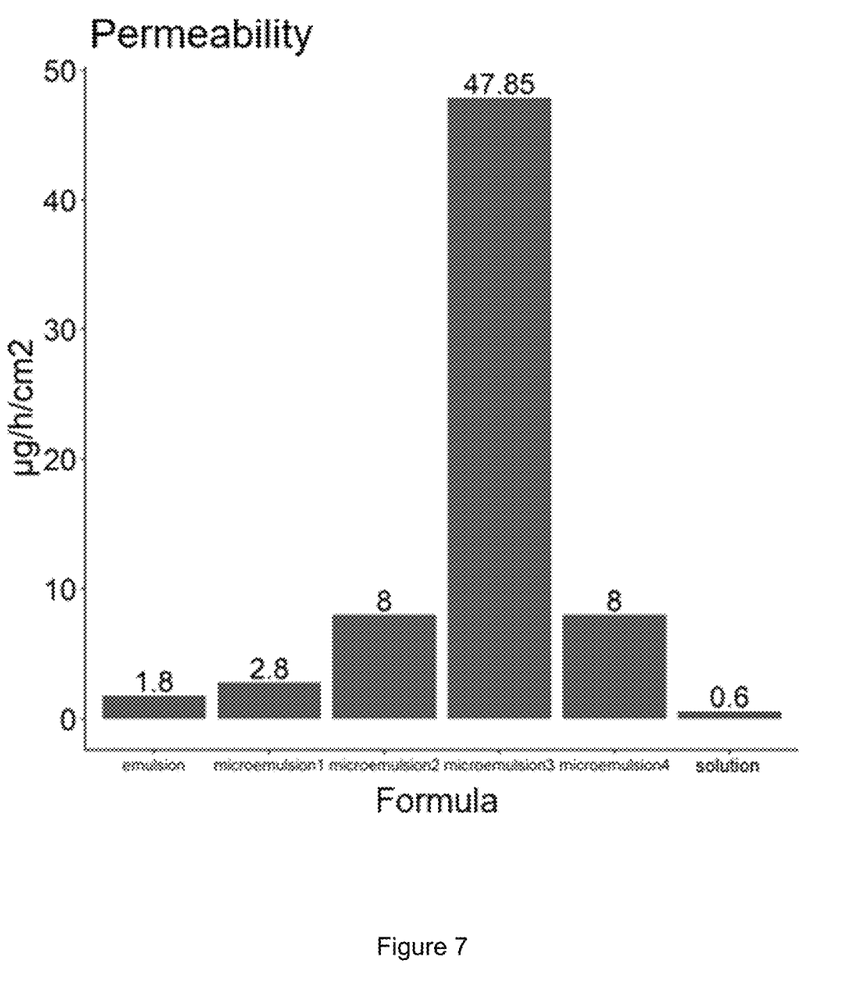
FIG. 7 depicts the permeability plot obtained from the different formulations of the invention.

FIG. 7 shows the results of the permeability analysis of the different formulations. The test was carried out by means of a permeability study of synthetic membranes in a Franz cell, where the amount of active ingredient that passed through a membrane composed of two layers of polyethersulfone and a polyolefin marketed under the brand name Millipore with polarity and pore size similar to that of human skin, and as a receptor medium, isotonic phosphate solution pH 7.4 (PBS: 7.4) was quantified. As can be seen, in general, the smaller the particle size, the better the permeability of the formulation. Similarly, the particle size and the specific composition of the micelle or particles affect the permeability (the polarity of the micellar structures may favor or reduce the permeability of the system formed independently from the particle size of the structures produced).

Figure 8:
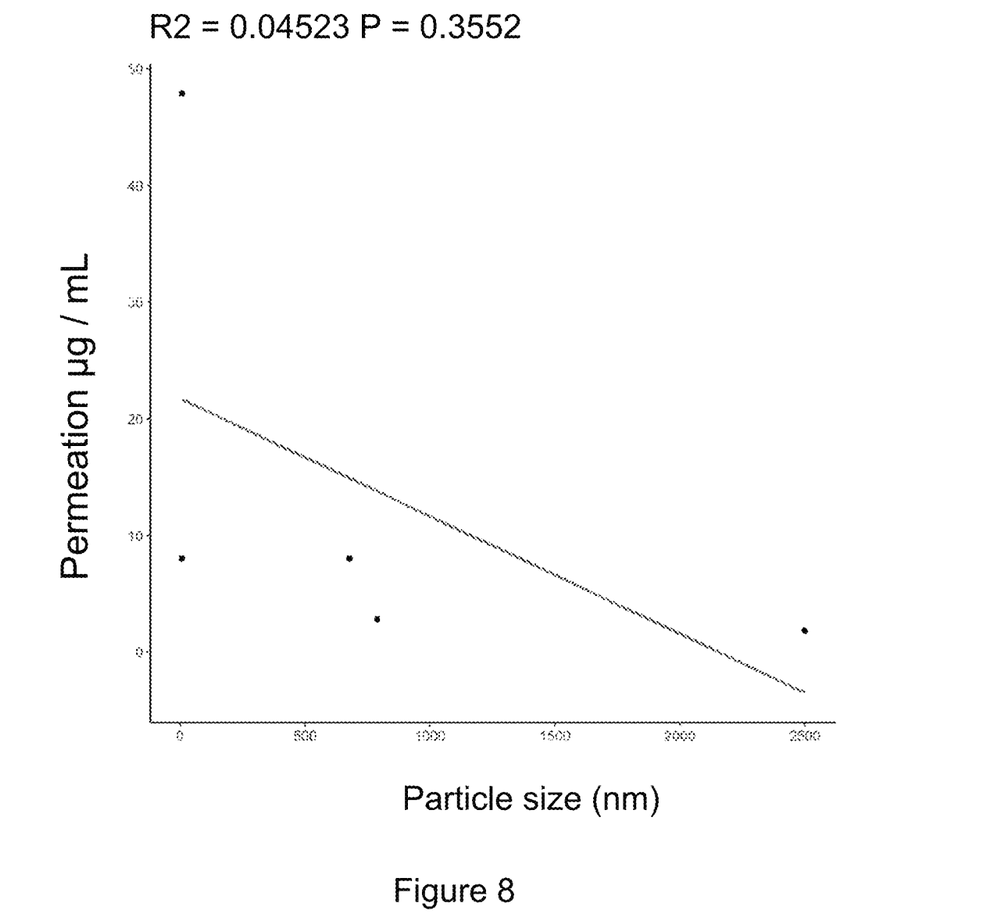
FIG. 8 shows a linear regression between particle size and permeation of 18β-GA from the formulation. The $R^2$(r squared) value close 0 and P>0.05 (p-value) indicate that there is no correlation between particle size and permeation of 18β-GA. This indicates that, for a given formulation, all its components (particle size, type and proportion of excipients, concentration of the active ingredient and emollient effect of the excipients) are involved in achieving higher permeability.

The results of the above characterizations denote the importance of particle size in increasing drug permeation. However, in FIG. 8, it is shown that, when making a correlation between the particle sizes of the different formulations and their permeability, particle size is not the only factor that determines the permeability of the formulation. This is explained by the synergistic effect between decreased particle size, the emollient effect of one of the excipients used in the formulation and the structural composition of the micelles in the formulation. The emollient effect of the excipients fulfills the function of modifying the structure of the skin, changing the stiffness of the tissue, and thereby facilitating the permeability of the nano-emulsion particles.

The excipients that act as surfactants and cosurfactants give the structure of the nano-emulsion micelles a polarity, which is another factor that increases the permeation of the formula and helps with its stabilization, preventing the agglomeration of the particles due to the electrostatic repulsion between them.

Table 1 shows the comparison between different properties of the previously described formulations and the nano-emulsion of the present invention. The properties of the best formulation reported in each case are described in the table. As can be seen, the present formulation has significantly smaller particle sizes compared to previously reported results. Likewise, drug permeation is significantly higher.

TABLE 1

| Formulation | Type | % 18 β Concentration | Particle size (nm) | Permeation (μg/h/cm2) | Remarks |
|---|---|---|---|---|---|
| Invention | Nano-emulsion | 1.0-5.0 | 7 ± 2.1 | 4.52 ± 0.15 | |
| Invention | Gelled Nano-emulsion | 1.0-4.0 | 10.14 ± 2.5 | 1.66 ± 0.15 | |
| Carmelo Puglia, et al. | Nano-emulsion | 0.5 | 210 ± 30.1 | 0.60 ± 0.08 | Unstable at room temperature |
| S.li et al | Liposomes | 0.3-0.9 | 20 to 170 | 0.46 | |
| Moumita Mishra et al | Nano-emulsion | Not reported | 58 to 183 | 0.297 | |

From the solutions, emulsions and nanoemulsions described in the present invention, following pharmaceutical forms are derived:

In one embodiment the pharmaceutical form is an aerosol. For its preparation, a nano-emulsion of 18β-GA with a particle size of 1-50 μm is dispersed in a pharmaceutically acceptable gas as hydrofluorocarbons hydrocarbons such as chlorofluorocarbons, hydrofluorocarbons, specifically tetrafluoroethane, liquefied gases or inert gases such as nitrogen carbon dioxide, nitrous oxide or compressed air, in doses comprising 4 μg to 20 mg per applied dose.

In one embodiment, the dosage form is a nebulizing agent, for its preparation, to a solution of 18β-GA dissolved in 25-80% of the final mixture, the following is added: a Surfactant 5-30%, cosurfactant 2-20%, surface-active agent 5-30% and an oleaginous vehicle (5-30%) preservative 0.5-2%, antioxidant 0.1-1.0% such as diethylene glycol monoethyl ether, polysorbate derivatives, polyoxyglycerides or myristic acid derivatives, ethanol to be used in nebulizer therapies, by dispersing the product in isotonic solutions or in water prior to the start of treatment and obtaining particle sizes ranging from 8 nm to 1 μm.

In another embodiment, the pharmaceutical form is a sterile solution. This is prepared with glycyrrhetinic acid (18β) dissolved in a solvent (25-90%), surfactant 5-50% and a diluent, such as diethylene glycol monoethyl ether, ethoxylated polyethylene glycol derivatives with alkylated chains from C10 to C20, Polyoxyglycerides, castor oil and its derivatives, water, ethanol, at doses of glycyrrhetinic acid (18β) which can comprise from 0.5 to 15%, the obtained solution is filtered through a 0.22 μm membrane under aseptic conditions to proceed to terminal sterilization by moist heat.

In another embodiment, the dosage form is a foam. The formulation consists of enoxolone dissolved in a solvent (25-90%), surfactant 5-50%, surface-active agent 5-30%, preservative 0.5-2%, antioxidant 0.1-1.0% and a diluent, such as diethylene glycol monoethyl ether, ethoxylated polyethylene glycol derivatives with alkylated chains from C10 to C20 Polyoxyglycerides, myristic acid derivatives, castor oil and its derivatives, water, ethanol, in dosages which may comprise from 0.5-15%, the above description shall be packaged with an inert gas as propellant, such gases comprise but are not limited to compressed air, nitrogen and carbon dioxide.

In another embodiment, the formulation is a lyophilized formulation. Enoxolone dissolved in a solvent (25-90%), Surfactant 5-50%, surface-active agent 5-30%, preservative 0.5-2%, antioxidant 0.1-1.0%, cryoprotectants 10-40% a liquid and solid diluent, such as diethylene glycol monoethyl ether, ethoxylated polyethylene glycol derivatives with C10 to C20 alkylated chains, polyoxyglycerides, myristic acid derivatives, castor oil and its derivatives, water, ethanol, sorbitol, mannitol, or lactose, in doses of Enoxolone that can range from 0.5 to 15%, to be subjected to lyophilization and obtain a low water product.

In another embodiment the formulation is a solid. For its manufacture, enoxolone is mixed in pharmaceutically acceptable excipients comprising and not limited to Diluent 30-90%, lubricant 0.5-5.0%, disintegrant 0.5-5.0%, anti-sticking agent 0.5-5.0%, surfactants 0.5-10% and binders 1.0-20.0%; as diluents we may mention without limiting; microcrystalline cellulose, carbohydrates and their derivatives (lactose, mannitol, sorbitol, etc.), co-processed cellulose derivatives and their combinations, lubricants: Sodium benzoate, stearic acid, and its derivatives, disintegrant: sodium croscarmellose, corn starch, crospovidone, etc., Anti-sticking agent: talc, silicon dioxide, leucine, etc. Surfactant: sodium lauryl sulfate, polysorbate and its derivatives, docusate sodium, binder: polyvinylpyrrolidone, corn starch, cellulose derivatives. The above mixture may be encapsulated in hard gelatin capsules or tablets by compression.

In another embodiment the formulation is a soft gelatin capsule. For its preparation, enoxolone is dissolved in a solvent (25-90%), Surfactant 5-30%, cosurfactant 2-20%, surface-active agent 5-30% and an oleaginous vehicle (5-30%), preservative 0.5-2%, antioxidant 0.1-1.0%, such as diethylene glycol monoethyl ether, ethoxylated derivatives of polyethylene glycol with alkylated chains from C10 to C20, polyoxyglycerides, castor oil and its derivatives, at dosages which may comprise from 0.5 to 15%, the above description may be dosed in soft gelatin capsules.

In another embodiment, the formulation is an implant. It is made using enoxolone dispersed in thermoplastic polymers comprising, but not limited to, polyurethane derivatives or polylactic acid derivatives in proportions comprising 30-95%, the above mixture may be mixed and not limited to a plasticizer, mucoadhesive for fusion molding for final application, at dosages of Enoxolone which may comprise without limitation at least 20%.

In another embodiment, the dosage form is a transdermal patch. For its preparation, enoxolone is dissolved in a solvent (25-90%), surfactant 5-30%, cosurfactant 2-20%, surface-active agent 5 to 30% and an oleaginous vehicle (5-30%), preservative 0.5-2%, antioxidant 0.1 to 1.0% and a diluent such as diethylene glycol monoethyl ether, ethoxylated derivatives of polyethylene glycol with alkylated chains from C10 to C20, polyoxyglycerides, myristic acid derivatives, castor oil and its derivatives, water, ethanol, at dosages which may comprise from 0.5 to 20%, the above mixture is sprayed or atomized on a surface of thermoplastic polyurethane, polyisobutylene or polylactic acid derivatives, to form the release modulating film which will be adhered to a layer of polyethylene terephthalate which will constitute the carrier film.

Having described the invention as previously mentioned, the following claims are claimed as property:

1. Pharmaceutical formulation in form of a solution, an emulsion or a nano-emulsion of 18β-glycyrrhetinic acid, characterized in that it comprises 18β-glycyrrhetinic acid in a concentration of 0.001% to 30% by weight of the formulation, wherein the formulation further comprises 2-(2-ethoxyethoxy)-ethanol as a solubilizing agent in a concentration of 40 to 71.6% by weight of the formulation; at least one stabilizer agent selected from polyoxyglycerides, at least one ethoxylated fatty alcohols; and an emollient oleaginous vehicle.

2. The formulation in accordance with claim 1, wherein the at least one stabilizer agent is a polyoxylglyceride of capric, lauric, linoleic, oleic acid or stearic acid triglycerides, the at least one ethoxylated fatty alcohol has the general structure R—(OCH$_2$CH$_2$)$_n$—OH where R is an alkyl chain with a size from 12 to 18 carbons and n represents the moles of ethylene oxide, which may have a value of 2 to 25; and the oleaginous vehicle is isopropyl myristate.

3. The formulation in accordance with claim 1, wherein the percentages by weight are: 0.001% to 30% for 18β-glycerrhetinic acid, 40% to 71.6% for 2-(2ethoxyethoxy)-ethanol; 1% to 15% for the polyoxylglycerides, 0% to 15% for the at least one ethoxylated fatty alcohol, and 10% to 20% for the emollient oleaginous vehicle.

4. The formulation in accordance with claim 1, wherein the solution has a permeation of 0.6 μg/h/cm$^2$.

5. The formulation in accordance with claim 1, wherein the formulation comprising an 18β-glycyrrhetinic acid is an emulsion characterized in that it comprises additionally a castor oil or its derivatives; and distilled water; wherein the polyoxylglyceride is a polyoxylglyceride of capric, lauric, linoleic, oleic acid, or stearic acid triglycerides; the at least one ethoxylated fatty alcohol has the general structure R—(OCH2CH2)n-OH where R is an alkyl chain with size of 12 to 18 carbons and n represents the moles of ethylene oxide, which can have a value of from 2 to 25; and the emollient oleaginous vehicle is isopropyl myristate.

6. The formulation in accordance with claim 1, wherein the formulation comprising an 18β-glycyrrhetinic acid is a nano-emulsion characterized in that it comprises additionally a castor oil or its derivatives; and distilled water; wherein the polyoxylglyceride is a polyoxylglyceride of capric, lauric, linoleic, oleic acid, or stearic acid triglycerides; the at least one ethoxylated fatty alcohol has the general structure R—(OCH2CH2)n-OH where R is an alkyl chain with size from 12 to 18 carbons and n represents the moles of ethylene oxide, which can have a value from 2 to 25; and the emollient oleaginous vehicle is isopropyl myristate.

7. The formulation in accordance with claim 5, wherein the percentages by weight of the components are: 0.001% to 30%, for 18β-glycyrrhetinic acid; 40% to 60% for 2-(2-ethoxyethoxy)-ethanol; 1% to 15% for polyoxyglycerides; 10% to 20% for emollient oleaginous vehicle; 0% to 20% for castor oil or its derivatives, 0% to 15% for ethoxylated fatty alcohol; and 5% to 50% for distilled water.

8. The formulation in accordance with claim 5, wherein the resulting emulsion has a permeation of 1.8 μg/h/cm$^2$, a particle size of 2500 nm, a hydrodynamic radius of 2850 nm, a diffusion coefficient of 1.26 μm$^2$/s and a polydispersity of 39.8.

9. A gel characterized in that it comprises the formulation according to claim 1, wherein the gel comprises gelling elements comprising one or more cellulose derivatives.

10. The gel in accordance with claim 9, wherein the gel comprises preservative and stabilizing agents selected from a group consisting of butylated hydroxytoluene (BHT), butylated hydroxyanisole, L-cysteine, propylparaben, methylparaben, benzalkonium chloride, sodium benzoate and benzoic acid.

11. The formulation according to claim 6, characterized in that the percentages by weight are: 0.001% to 30% for 18β-glycyrrhetinic acid; 40% to 71.6% for 2-(2-ethoxyethoxy)-ethanol; 1% to 15% for polyoxyglycerides; 10% to 20% for isopropyl myristate; 0% to 20% for castor oil or its derivatives; 0% to 15% for the at least one ethoxylated fatty alcohol; and 5% to 50% for distilled water.

12. The formulation according to claim 6, characterized in that it has a particle size of 1 to 100 nm, or from 500 to 1000 nm.

13. The formulation according to claim 6, characterized in that the permeation value of the nano-emulsion is of 1.98 to 47.85 μg/h/cm$^2$, wherein the nano-emulsion has a diffusion coefficient of a 0.003 to 12.98 μm$^2$/s and a polydispersity of 2 to 50.

14. The formulation according to claim 12, characterized in that it has a particle size of 1 to 20 nm, or from 600 to 700 nm.

15. The formulation according to claim 1, wherein the 18β-glycyrrhetinic acid is in a concentration of 1% to 30% by weight of the formulation.

16. The formulation according to claim 1, wherein the 2-(2-ethoxyethoxy)-ethanol is in a concentration of 44% to 71.6% by weight of the formulation.

17. The formulation according to claim 5, wherein the derivatives of the castor oil are selected from a group consisting of polyoxyethylenes from the castor oil and hydrogenated castor oils.

18. The formulation according to claim 6, wherein the derivatives of the castor oil are selected from the group consisting of polyoxyethylenes from the castor oil and hydrogenated castor oils.

19. The formulation according to claim 7, wherein the percentages by weight for 18β-glycyrrhetinic acid range from 0.01% to 5%.

20. The gel of claim 9 wherein the cellulose derivatives are selected from the group consisting of hydroxypropyl cellulose (HPC), hydroxyethyl cellulose (HC) or hydroxypropyl methyl cellulose (HPmC), acrylic acid polymers and a member of the poloxamer family.

21. The formulation according to claim 11, wherein the percentages by weight for 18β-glycyrrhetinic acid range from 0.01% to 5%.

\* \* \* \* \*